(12) United States Patent
Heikinheimo

(10) Patent No.: US 8,045,968 B2
(45) Date of Patent: Oct. 25, 2011

(54) METHOD FOR FORMING AN AUDIOVISUAL CALL IDENTIFIER, A MOBILE COMMUNICATION DEVICE AND A CALL IDENTIFER

(75) Inventor: Hanna Heikinheimo, Espoo (FI)

(73) Assignee: Manor Research, L.L.C., Dover, DE (US)

( * ) Notice: Subject to any disclaimer, the term of this patent is extended or adjusted under 35 U.S.C. 154(b) by 728 days.

(21) Appl. No.: 11/664,372

(22) PCT Filed: Sep. 14, 2005

(86) PCT No.: PCT/FI2005/050316
§ 371 (c)(1),
(2), (4) Date: Feb. 11, 2008

(87) PCT Pub. No.: WO2006/037850
PCT Pub. Date: Apr. 3, 2006

(65) Prior Publication Data
US 2008/0261575 A1 Oct. 23, 2008

(30) Foreign Application Priority Data
Oct. 1, 2004 (FI) ..................................... 20041277

(51) Int. Cl.
*H04M 3/42* (2006.01)
(52) U.S. Cl. .................. 455/415; 455/412.1; 455/412.2; 455/413; 455/414.1; 455/416; 379/142.01; 379/142.08; 379/88.21
(58) Field of Classification Search ..... 455/412.1–412.2, 455/413, 414.1, 415–417; 379/142.01–142.09, 379/142.1, 142.11–142.18, 88.21–88.27
See application file for complete search history.

(56) References Cited

U.S. PATENT DOCUMENTS

| 6,775,463 | B1 * | 8/2004 | Nooralahiyan et al. | ....... 386/343 |
| 2003/0001882 | A1 | 1/2003 | Macer et al. | .................. 345/733 |
| 2003/0100295 | A1 * | 5/2003 | Sakai et al. | .................... 455/415 |
| 2004/0121818 | A1 * | 6/2004 | Paakkonen | .................... 455/567 |

FOREIGN PATENT DOCUMENTS
EP 1 033 857 A2 9/2000
(Continued)

*Primary Examiner* — Wayne Cai
(74) *Attorney, Agent, or Firm* — Stolowitz Ford Cowger LLP

(57) ABSTRACT

In the invention, an audiovisual call identifier including image and sound is formed for a mobile communication device. The call identifier is repeated on the display and in the loudspeaker of the communication device when a call comes in, i.e. it functions in the same way as an ordinary ring tone when it is used. The first step in the method is to take a shot including moving image and sound by a video camera. The shot taken is saved in the memory of the communication device as a video clip and set as a call identifier of the communication device. The video clip can be taken either by a video camera belonging to the communication device or by a separate device. The call identifier can be set as a general notification sign or it can be associated with a certain phone number or numbers in the phone memo of the communication device, in which case the video clip is repeated on the display and in the loud-speaker of the communication device when a call comes from the phone number(s) in question. The call identifier or a part thereof can also be used as a notification of a phone call arrived in the communication device, which has not been answered.

13 Claims, 2 Drawing Sheets

FOREIGN PATENT DOCUMENTS

| | | |
|---|---|---|
| EP | 1 117 245 A1 | 12/2000 |
| EP | 1 202 536 A1 | 5/2002 |
| EP | 1202536 A1 * | 5/2002 |
| FR | 2 860 942 | 4/2005 |
| JP | 2002-247206 | 8/2002 |
| JP | 2004-201249 | 7/2004 |
| JP | 2004-228755 | 8/2004 |
| JP | 2004-274494 | 9/2004 |
| KR | 10-2003-0056467 | 7/2003 |
| WO | WO 00/79770 A1 | 12/2000 |
| WO | WO 2004/054278 A2 | 6/2004 |
| WO | WO 2004/056073 A2 | 7/2004 |

* cited by examiner

METHOD FOR FORMING AN AUDIOVISUAL CALL IDENTIFIER, A MOBILE COMMUNICATION DEVICE AND A CALL IDENTIFER

FIELD OF THE INVENTION

The invention relates to a method for forming an audiovisual call identifier in a mobile communication device. The invention also relates to a mobile communication device and an audiovisual call identifier.

BACKGROUND

Various ring tones, from which the user can select the one desired, have usually been saved in the memory of the mobile phone by the manufacturer. Most mobile phones include the possibility of associating the phone numbers saved in the electronic phone memo of the mobile phone with a distinctive ring tone for each phone number or group of numbers. So the recipient of the call can identify the caller or the group at once on the basis of the ring tone.

In addition to the ring tones that are already saved in the phone, it is possible to order more different ring tones to the mobile phone. Ordering ring tones takes place by sending an order message to a service provider producing ring tones, after which the service provider sends the ring tone to the orderer's mobile phone as a text message. Although there is a large number of service providers offering ring tones, it is often difficult to find an individual and really distinctive ring tone. In addition, the service providers usually charge for the ring tones ordered from them.

The user of a mobile phone can also compose an individual piece of music and save it as the ring tone of the mobile phone. However, composing a ring tone of one's own is difficult and requires musical skill and experience from the user of the phone. In addition, for composing a ring tone of one's own, the user of the phone must have an application program suited for the purpose.

Some mobile phones also have audio recording capability. Then the user of the phone can record the desired tone in the memory of the mobile phone and set it as the ring tone of the phone. In addition, the phone memos of some mobile phones provide the possibility of adding an image or graphical animation in connection with the cell phone number of a person or a group, in which case the image or graphical animation appears on the display of the phone when the person or member of the group in question calls. So, using this combination, it is possible to create a call identifier including image and sound in mobile phones. However, this requires combining measures performed separately by the user of the phone.

In addition, the call identifier obtained as a result of combining images and audio files formed separately often has a clumsy appearance and no personal touch.

SUMMARY

The purpose of the invention is to provide a method for forming a personal and distinctive, audiovisual call identifier in a mobile communication device, such as a mobile phone, and a mobile communication device and a call identifier, by which the drawbacks of the prior art can be reduced.

The objects of the invention are achieved by a method, a mobile communication device and a call identifier, which are characterized in what is set forth in the independent claims. Some preferred embodiments of the invention are presented in the dependent claims.

In the method according to the invention, an audiovisual call identifier comprising image and sound is formed for a mobile communication device. The call identifier is repeated on the display and loudspeaker of the communication device when the call arrives, i.e. it functions in the same way as an ordinary ring tone. The first step in the method is to take a shot comprising moving image and sound by a video camera. The shot taken is saved in the memory of the mobile communication device as a video clip and set as the call identifier of the communication device.

In a preferred embodiment of the invention, the video clip is taken by a video camera included in the mobile communication device.

In another preferred embodiment of the invention, the video clip is taken by a separate video camera not belonging to the mobile communication device, and transferred to the memory of the communication device by some data transfer means.

In a third preferred embodiment of the invention, the call identifier is associated with a phone number or numbers in the phone memo of the mobile communication device, in which case the video clip is repeated on the display and loudspeaker of the mobile communication device when the call arrives from the phone number or numbers.

In a fourth preferred embodiment of the invention, the call identifier or a part thereof is repeated on the display of the mobile communication device as notification of a call arrived in the communication device, which has not been answered.

In that case, the call has arrived from the phone number associated with the call identifier.

The invention has the advantage that forming a call identifier including image and sound takes place quickly and easily and does not require special skills.

In addition, the invention has the advantage that the call identifier according to the invention is always original and individual, which makes it easier to identify the caller associated with the call identifier.

A further advantage of the invention is the fact that it increases the choices available to the user of the mobile communication device and improves the possibilities of the user of the communication device to modify the properties of the communication device in the desired manner.

BRIEF DESCRIPTION OF THE DRAWINGS

In the following, the invention will be described in more detail. Reference will be made to the accompanying drawings, in which.

DETAILED DESCRIPTION

The mobile communication device according to the invention, such as a mobile phone, has, in the known manner, a selection of different ring tones, which the user of the phone can select as notification of an incoming call. In addition to these, the mobile communication device 100 according to the invention provides the possibility of informing the user of the phone of the incoming call by an audiovisual call identifier 200, which comprises moving image and sound. The moving image is presented on the display 102 of the communication device, and the sound is made audible through the loudspeaker 104 of the communication device. If the mobile communication device has been set in the mute alarm mode, the sound belonging to the call identifier is then naturally not heard in the call situation.

Figure 1:
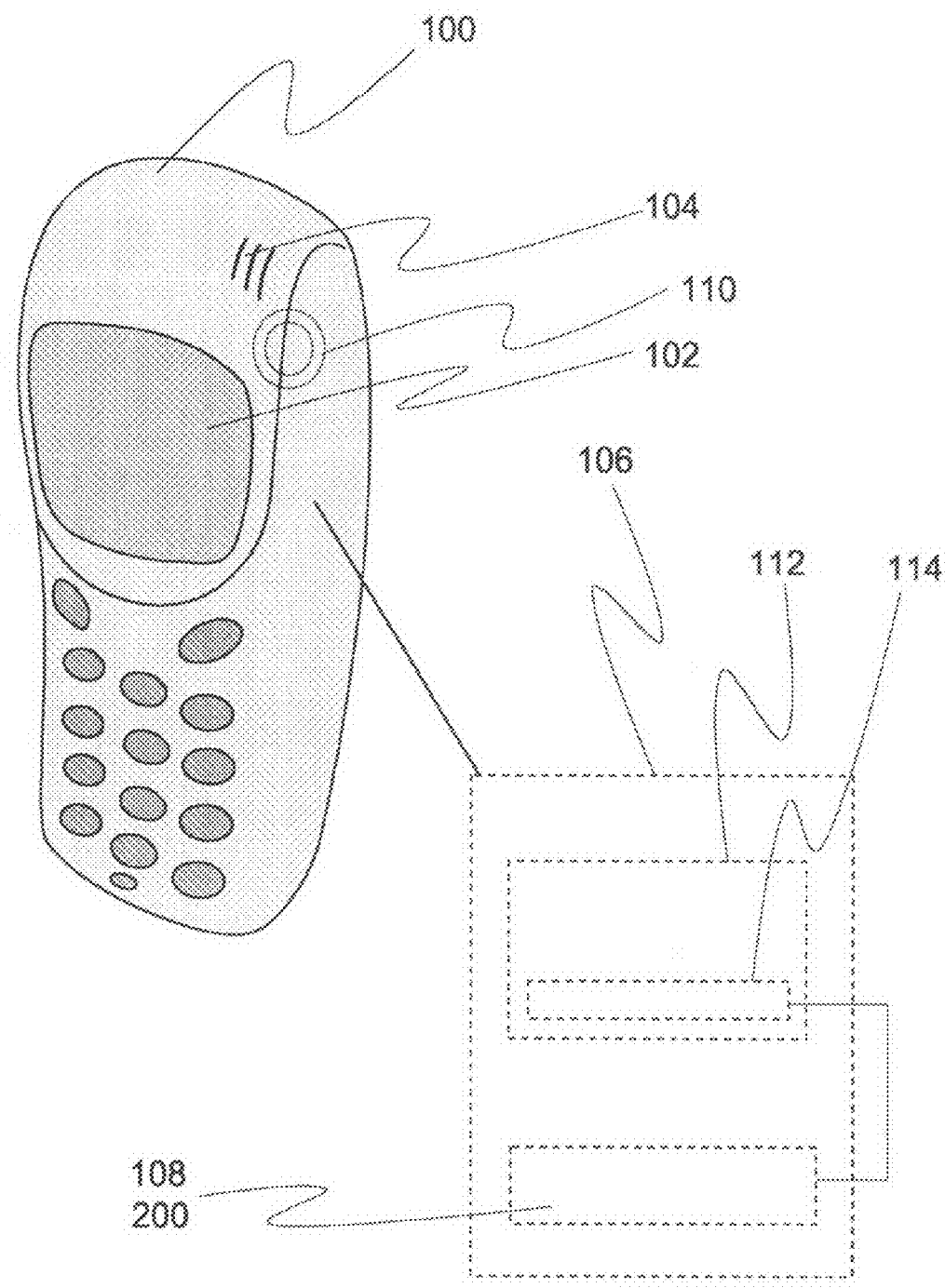
FIG. 1 shows, by way of example, a mobile communication device according to the invention from the front and a schematic diagram of a part of the internal structure of the communication device.

In the invention, the audiovisual call identifier 200 has been filmed by a video camera 110 and saved in the memory 106 of the mobile communication device as an electronic video clip 108. The video camera is preferably a fixed part of the communication device, like in the case shown by FIG. 1. In the communication device shown by FIG. 1, the lens of the video camera is located on the rear surface of the device and is therefore drawn with a broken line. The video camera in connection with the communication device is always usable by the carrier of the communication device, which makes it easy to film and save a call identifier also in suddenly appearing and spontaneous situations. However, the video camera can also be a separate device not belonging to the communication device. The separate filming device need not be an actual video camera, but it can also be some other device suited for saving shots containing moving image and sound, such as a digital camera with the capability of taking video clips. Then the call identifier is filmed by a separate device and transferred by some suitable data transfer means to the memory of the communication device. Saving the call identifier 200 electronically in the memory 106 of the communication device 100 naturally requires that the video clip is in digital form. A suitable digital saving format is selected on the basis of the saving properties of the video camera and the reproduction properties of the communication device. Possible digital saving formats are then, for example, saving formats with the file endings .avi, .mov, .mpg, .mpeg, .rm and .asf.

The user of the mobile communication device can use the audiovisual call identifier 200 saved in the memory of the phone in a similar manner as the conventional ring tones. This means that the user can set the call identifier according to the invention as a general alarm sign informing of an incoming call, or the call identifier can be associated with a certain phone number 114 or a group of numbers, which have been saved in the phone memo 112 in the memory 106 of the communication device. Then the communication device informs of the incoming call by a call identifier according to the invention only when the call comes from a phone number or numbers associated with the call identifier.

In a preferred embodiment of the invention, a mobile communication device has been provided with a property by which the user of the communication device is informed of the unanswered calls by a call identifier according to the invention. In this embodiment, the communication device shows the phone number 114 of the person who made the call that remained unanswered, or instead of the name of the caller, the call identifier associated with the phone number. In this case, the call identifier is advantageously repeated only visually on the display of the communication device without a sound from the loudspeaker. Instead of an entire call identifier, it is also possible to repeat a shorter part of it, preferably only one freeze frame.

Figure 2:
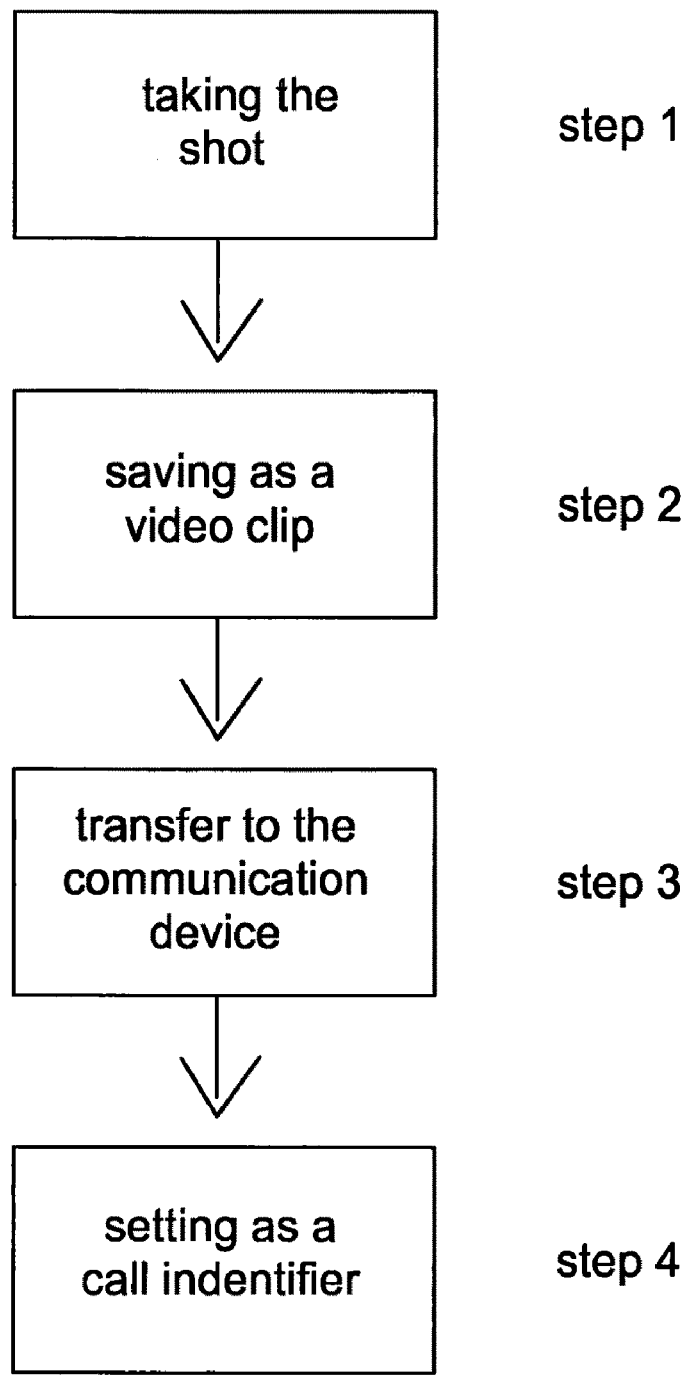
FIG. 2 is a diagram of the different steps of the method according to the invention.

FIG. 2 shows the different steps of the method according to the invention as a simple diagram. In step 1 of the method according to the invention, a shot containing moving image and sound is first taken by using the ordinary video imaging technique. In step 2, this shot is saved in digital form as a video clip 108 on an electronic storage medium. When a digital imaging device is used, the saving according to step 2 takes place simultaneously with the imaging without separate measures. In step 3, the video clip is transferred from the storage medium to the memory 106 of the mobile communication device, in which it is set in step 4 as a call identifier 200 functioning in the same way as the conventional ring tones. In a preferred embodiment of the invention, the video clip is taken by a video camera 110 in the communication device, which saves the video clip directly into the memory of the communication device. In that case, a separate storage medium is naturally not required. The audiovisual call identifier saved in the memory of the communication device is handled in the communication device in the same way as a conventional ring tone.

In the method according to the invention, it is also possible to use ready-made video clips, which have been saved on some electronic storage medium. So, the video clips can be taken by a different person than the user of the mobile communication device. The user of the mobile communication device can thus, for example, find a suitable video clip from the Internet by a browser and set it as the call identifier of the communication device. It is also possible to use a video clip received by the communication device as the call identifier. The received video clip can be ordered from a commercial service provider or it can be sent by some other person.

Some preferred embodiments of the method, mobile communication device and call identifier according to the invention have been described above. The invention is not limited to the solutions described above, but the inventive idea can be applied in numerous ways within the limits set by the claims.

The invention claimed is:

1. A method for forming an audiovisual call identifier in a mobile communication device, comprising:
    taking, by a video camera, a video clip comprising moving image and sound,
    saving the video clip onto an electronic storage medium,
    transferring the video clip from the electronic storage medium to a memory of the mobile communication device;
    setting the video clip as a call identifier of the mobile communication device;
    in response to receiving a call from a phone number associated with the call identifier, displaying the moving image of the video clip on a display and playing the sound of the video clip on a loudspeaker of the mobile communication device; and
    in response to the call not being answered, subsequently displaying at least a portion of the moving image of the video clip on the display but not playing the sound of the video clip on the loudspeaker.

2. A method according to claim 1, where the video camera is a video camera in the mobile communication device.

3. A method according to claim 1, where the video camera is a separate video camera not belonging to the mobile communication device and the video clip is transferred by a data transfer means into the memory of the mobile communication device.

4. A method according to claim 1, where the call identifier is associated with at least two phone numbers in a phone memo of the mobile communication device, whereby the moving image of the video clip is displayed on the display and the sound of the video clip is played on the loudspeaker of the mobile communication device when a call comes in from any one of the at least two phone numbers in the phone memo.

5. A method according to claim 1, where the at least a portion of the video clip is a freeze frame of the moving image of the video clip.

6. A mobile communication device comprising:
    a memory configured to save a call identifier comprising an audiovisual call identifier; and a loudspeaker and a display configured to present the audiovisual call identifier when a call comes in from a phone number associated with the call identifier;

where the audiovisual call identifier is a video clip comprising a moving image and sound; and where, in the event the call that comes in is not answered, at least a portion of the moving image of the video clip is subsequently displayed on the display but the sound of the video clip is not played on the loudspeaker.

7. A mobile communication device according to claim 6, further comprising a video camera configured to take the video clip.

8. A mobile communication device according to claim 6, further comprising:

a phone memo configured to save phone numbers in the memory;

where the call identifier is associated with at least two phone numbers saved in the phone memo; and where the moving image of the video clip is presented on the display and the sound of the video clip played on the loudspeaker when a call comes in from any one of the at least two phone numbers saved in the phone memo.

9. An audiovisual call identifier of a mobile communication device, comprising:

a memory configured to store a video clip comprising moving image and sound and configured to store a phone memo comprising phone numbers;

where a particular video clip is associated with at least one phone number stored in the phone memo and is selected to be presented to a user of the mobile communication device when a call is received from the associated phone number, the moving image of the selected video clip being displayed on a visual display of the mobile communication device and the sound of the video clip played on a loudspeaker of the mobile communication device; and where, in the event the received call is not answered, at least a portion of the moving image of the video clip is subsequently displayed on the visual display but the sound of the video clip is not played on the loudspeaker.

10. The call identifier according to claim 9, where the video clip is taken by a video camera in the mobile communication device and saved in the memory of the mobile communication device.

11. The call identifier according to claim 9, where the video clip is taken by a separate video camera not belonging to the mobile communication device and transferred by a data transfer means to the memory of the mobile communication device.

12. The call identifier according to claim 11, where the video clip is one selected by use of a browser and is then downloaded and stored in the memory in association with the at least one phone number.

13. The call identifier according to claim 9, where the at least a portion of the moving image of the video clip is a freeze frame of the moving image of the video clip.

* * * * *

UNITED STATES PATENT AND TRADEMARK OFFICE
CERTIFICATE OF CORRECTION

PATENT NO. : 8,045,968 B2
APPLICATION NO. : 11/664372
DATED : October 25, 2011
INVENTOR(S) : Heikinheimo Page 1 of 1

It is certified that error appears in the above-identified patent and that said Letters Patent is hereby corrected as shown below:

Title page, item (54), under "Title", in Column 1, Line 4, delete "IDENTIFER" and insert -- IDENTIFIER --.

Title page, item (87), under "PCT Pub. Date", in Column 1, Line 1, delete "Apr. 3, 2006" and insert -- Apr. 13, 2006 --.

Title page, item (57), under "Abstract", in Column 2, Line 16, delete "loud-speaker" and insert -- loudspeaker --.

Column 1, line 4 (in the Title), delete "IDENTIFER" and insert -- IDENTIFIER --.

Column 4, line 32, in Claim 1, delete "sound," and insert -- sound; --.

Column 4, line 33, in Claim 1, delete "medium," and insert -- medium; --.

Column 5, lines 25-26, in Claim 9, delete "comprising moving image" and insert -- comprising a moving image --.

Signed and Sealed this
Twenty-ninth Day of May, 2012

David J. Kappos
*Director of the United States Patent and Trademark Office*